(12) United States Patent
Leonhardt

(10) Patent No.: US 6,653,120 B1
(45) Date of Patent: Nov. 25, 2003

(54) PROCESS FOR REDUCING VOLATILE ORGANIC COMPOUND CONTENT OF REFINERY LIQUID WASTE STREAMS USING AQUEOUS SOLUTIONS CONTAINING MICROBES

(75) Inventor: Gene Leonhardt, Texas City, TX (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 58 days.

(21) Appl. No.: 09/853,907

(22) Filed: May 11, 2001

Related U.S. Application Data
(60) Provisional application No. 60/208,216, filed on May 31, 2000.

(51) Int. Cl.[7] .............................. B01D 53/84
(52) U.S. Cl. .............. 435/266; 435/262.5; 210/611
(58) Field of Search .................. 435/262, 262.5, 435/266, 289.1, 296.1, 300.1; 210/603, 610, 611

(56) References Cited

U.S. PATENT DOCUMENTS

| | | | | |
|---|---|---|---|---|
| 5,221,159 A | * | 6/1993 | Billings et al. | 405/128.35 |
| 5,232,596 A | * | 8/1993 | Castaldi | 210/603 |
| 5,942,552 A | * | 8/1999 | Cox | 521/65 |
| 5,985,649 A | * | 11/1999 | Stensel et al. | 435/266 |
| 6,077,704 A | * | 6/2000 | Vanderberg et al. | 435/262.5 |

FOREIGN PATENT DOCUMENTS

| | | | | |
|---|---|---|---|---|
| JP | 20000287679 A | * | 10/2000 | C12N/1/20 |

* cited by examiner

*Primary Examiner*—William H. Beisner
(74) *Attorney, Agent, or Firm*—Emch, Schaffer, Schaub & Porcello Co., L.P.A.

(57) ABSTRACT

A process and apparatus are provided for reducing volatile organic compound content, e.g., benzene content, of a hydrocarbon-containing gas stream, e.g., a refinery waste vapor stream by contacting the stream, preferably in a single pass, with an aqueous liquid medium containing volatile organic compound-metabolizing microbes, e.g., *Bacillus subtilis*, under volatile organic compound-metabolizing conditions. A treated stream results which contains volatile organic compound metabolization products of volatile organic compounds, e.g., water and carbon dioxide, and substantially reduced volatile organic compound content.

12 Claims, 11 Drawing Sheets

Table 1(a)
MICR-BLAZE FILTER READINGS
lift stations #26 (WEST)

| LIFT STA # | DATE | TIME | OUTLET PPM | INLET PPM | % Decrease | U.S. Filter out | % Decrease | OPR. Initials |
|---|---|---|---|---|---|---|---|---|
| 26 | 11/15/99 | 5:00 pm | 52.50 | 1750.00 | 97.00 | 9.56 | 81.79 | Gunter |
| 26 | 11/16/99 | 7:45 am | 7.70 | 1100.00 | 99.30 | 2.90 | 82.34 | R. Carr |
| 26 | 11/17/99 | 7:30 am | 11.90 | 2250.00 | 99.47 | 3.00 | 74.79 | Gunter |
| 26 | 11/18/99 | 2:30 pm | 5891.00 | 6891.00 | 14.51 | 7.10 | 99.88 | Young |
| 26 | 11/19/99 | 1:40 pm | 1800.00 | 3000.00 | 40.00 | 8.00 | 99.67 | Sell |
| 26 | 11/20/99 | 3:30 pm | 3550.00 | 5500.00 | 35.45 | 7.50 | 99.79 | Homann |
| 26 | 11/21/99 | 1:00 pm | 5690.00 | 6349.00 | 10.38 | 6.90 | 99.88 | Young |
| 26 | 11/22/99 | 8:45 am | 178.20 | 1973.00 | 90.97 | 6.80 | 96.18 | Roque |
| 26 | 11/23/99 | 1:30 pm | 4.97 | 1143.00 | 99.57 | 2.23 | 55.13 | Villarreal |
| 26 | 11/24/99 | 8:10 am | 30.20 | 957.00 | 96.84 | 6.70 | 77.81 | Roque |
| 26 (chng to 6%) | | | | | | | | |
| 26 | 11/25/99 | 8.05 am | 25.30 | 791.00 | 96.80 | N/a | #VALUE! | Roque |
| 26 | 11/26/99 | 8:30 am | 83.40 | 978.00 | 91.47 | N/a | #VALUE! | Roque |
| 26 | 11/27/99 | 12:30 pm | 3.70 | 300.00 | 98.77 | 2.50 | 32.43 | Villarreal |
| 26 | 11/28/99 | 3:00 pm | 1.67 | 26.00 | 93.58 | 1.57 | 5.99 | Homann |

Fig. 2a

Table 1(b)
MICR-BLAZE FILTER READINGS
lift stations #26 (WEST)

| LIFT STA # | DATE | TIME | OUTLET PPM | INLET PPM | % Decrease | U.S. Filter out | % Decrease | OPR. Initials |
|---|---|---|---|---|---|---|---|---|
| 26 | 11/29/99 | 1:30 pm | 2.00 | 2.00 | 0.00 | 2.00 | 0.00 | Virarreal |
| 26 | 11/30/99 | 11:30 am | 5.00 | 66.00 | 92.42 | 2.80 | 44.00 | R/C |
| 26 | 12/01/99 | 2:00 pm | 3.08 | 1682.00 | 99.82 | N/a | #VALUE! | Garland |
| 26 | 12/02/99 | 10:00 am | 5.70 | 1490.00 | 99.62 | 2.40 | 57.89 | Garland |
| 26 | 12/03/99 | 2:45 pm | 8.00 | 2800.00 | 99.71 | 2.40 | 70.00 | Carr |
| 26 | 12/04/99 | 3:40 pm | 398.00 | 4290.00 | 90.72 | 3.00 | 99.25 | Young |
| 26 | 12/05/99 | 2:00 pm | 2395.00 | 10000.00 | 75.05 | 23.89 | 99.00 | J. Smith |
| 26 | 12/06/99 | 4:00 pm | 8300.00 | 10000.00 | 17.00 | 13.00 | 99.84 | Young |
| 26 | 12/07/99 | 12:00 pm | 591.00 | 2695.00 | 78.07 | 2.12 | 99.64 | J. Smith |
| 26 | 12/08/99 | 2:00 pm | 7860.00 | 10000.00 | 21.40 | 4.00 | 99.95 | Marcusn |
| 26 | 12/09/99 | | 75.00 | 10000.00 | 99.25 | 11.00 | 85.33 | Marcum |

Fig. 2b

Table 1(c)
MICR-BLAZE FILTER READINGS
lift stations #26 (WEST)

| LIFT STA # | DATE | TIME | OUTLET PPM | INLET PPM | % Decrease | U.S. Filter out | % Decrease | OPR. Initials |
|---|---|---|---|---|---|---|---|---|
| 26 | 12/10/99 | | 122.00 | 10000.00 | 98.78 | 12.00 | 90.16 | Marcum |
| 26 | 12/11/99 | | 43.00 | 10000.00 | 99.57 | 3.00 | 93.02 | Marcum |
| 26 | 12/12/99 | | 16.00 | 10000.00 | 99.84 | 4.00 | 75.00 | M.S. |
| 26 | 12/13/99 | | 3.00 | 40.00 | 92.50 | 1.00 | 66.67 | A. Hill |
| 26 | 12/14/99 | | 27.00 | 10000.00 | 99.73 | 3.70 | 86.30 | M.S. |
| 26 | 12/15/99 | | 3700.00 | 5700.00 | 35.09 | 220.00 | 94.05 | A. Hill |
| 26 | 12/16/99 | | 2.60 | 5800.00 | 99.96 | 1.80 | 30.77 | Carr |
| 26 | 12/17/99 | | 4.60 | 4869.00 | 99.91 | 1.10 | 76.09 | Carr |
| 26 | 12/18/99 | | 56.00 | 10000.00 | 99.44 | 0.90 | 98.39 | H.P. |
| 26 | 12/19/99 | | 36.00 | 8600.00 | 99.58 | 2.60 | 92.78 | Carr |
| 26 | 12/20/99 | NO READINGS, RAIN OUT | | | #VALUE! | | #DIV/0! | E.C.H. |
| 26 | 12/21/99 | | 42.00 | 5600.00 | 99.25 | 1.80 | 95.71 | J. Young |
| 26 | 12/22/99 | | 47.00 | 6150.00 | 99.24 | 2.30 | 95.11 | E.C.H. |
| 26 | 12/23/99 | | 3950.00 | 10000.00 | 60.50 | 4.20 | 99.89 | Y. Young |

Fig. 2c

Table 1(d)
MICR-BLAZE FILTER READINGS
lift stations #26 (WEST)

| LIFT STA # | DATE | TIME | OUTLET PPM | INLET PPM | % Decrease | U.S. Filter out | % Decrease | OPR. Initials |
|---|---|---|---|---|---|---|---|---|
| 26 | 12/24/9 | | 22.00 | 3842.00 | 99.43 | 7.00 | 68.18 | C.R. |
| 26 | 12/25/99 | | 20.00 | 3675.00 | 99.46 | 1.00 | 95.00 | C.R. |

Fig. 2d

Table 2(a)
MICR-BLAZE FILTER READINGS
lift stations #28 (Y2K)

| LIFT STA # | DATE | TIME | OUTLET PPM | INLET PPM | % Decrease | U.S. Filter out | % Decrease | OPR. Initials |
|---|---|---|---|---|---|---|---|---|
| 26 | 11/15/99 | 5:00 pm | 52.50 | 1750.00 | 97.00 | 9.56 | 82.79 | Gunter |
| 28 | 11/15/99 | 5:00 pm | 185.00 | 3000.00 | 93.83 | 17.90 | 90.32 | Gunter |
| 26 | 11/16/99 | 7:45 am | 7.70 | 1100.00 | 99.30 | 2.90 | 62.34 | R. Carr |
| 28 | 11/16/99 | 7:45 am | 5500.00 | 10000.00 | 45.00 | 180.00 | 96.73 | R. Carr |
| 26 | 11/17/99 | 7:30 am | 11.90 | 2250.00 | 99.47 | 3.00 | 74.79 | Gunter |
| 28 | 11/17/99 | 7:30 am | 225.00 | 7500.00 | 97.00 | 15.10 | 93.29 | Gunter |
|  |  |  |  |  | #DIV/0! |  | #DIV/0! |  |
|  |  |  |  |  | #DIV/0! |  | #DIV/0! |  |
|  |  |  |  |  | #DIV/0! |  | #DIV/0! |  |
|  |  |  |  |  | #DIV/0! |  | #DIV/0! |  |
|  |  |  |  |  | #DIV/0! |  | #DIV/0! |  |
|  |  |  |  |  | #DIV/0! |  | #DIV/0! |  |
|  |  |  |  |  | #DIV/0! |  | #DIV/0! |  |
|  |  |  |  |  | #VALUE! |  | #VALUE! |  |

Fig. 3a

Table 2(b)
MICR-BLAZE FILTER READINGS
lift stations #26

| LIFT STA # | DATE | TIME | OUTLET PPM | INLET PPM | % Decrease | U.S. Filter out | % Decrease | OPR. Initials |
|---|---|---|---|---|---|---|---|---|
| | | | | | #DIV/0! | | #DIV/0! | |
| | | | | | #DIV/0! | | #DIV/0! | |
| 26 | 01/01/00 | | 10.00 | 10000.00 | 99.90 | 0.83 | 91.70 | Garland |
| 26 | 01/02/00 | | 5780.00 | 7800.00 | 25.90 | 401.00 | 93.06 | Carr |
| 26 | 01/03/00 | | 10000.00 | 10000.00 | 0.00 | 6.80 | 99.93 | Garland |
| 26 | 01/04/00 | FRESH SOL. ADDED | 169.00 | 10000.00 | 96.31 | 5.42 | 96.79 | Carr |
| 26 | 01/05/00 | | 45.00 | 195.00 | 76.92 | 0.52 | 98.84 | Carr |
| 26 | 01/17/00 | FRESH SOL. ADDED NO CAN. CHGD. | | | #DIV/0! | | #DIV/0! | |
| | | | | | #DIV/0! | | #DIV/0! | |

Fig. 3b

Table 3(a)
MICR-BLAZE FILTER READINGS
lift station #28 (EAST)

| LIFT STA # | DATE | TIME | OUTLET PPM | INLET PPM | % Decrease | U.S. Filter out | % Decrease | OPR. Initials |
|---|---|---|---|---|---|---|---|---|
| 28 | 11/29/99 | 1:30 pm | 3500.00 | 10000.00 | 65.00 | 3.00 | 99.91 | Villarreal |
| 28 | 11/30/99 | ? | ? | ? | #VALUE! | 64.00 | #VALUE! | R/C |
| 28 | 12/01/99 | ? | ? | ? | #VALUE! | ? | #VALUE! | ? |
| 28 | 12/02/99 | ? | ? | ? | #VALUE! | 5.60 | #VALUE! | ? |
| 28 | 12/03/99 | 2:45 pm | 19.70 | 3977.00 | 99.50 | 29.70 | 50.76 | Carr |
| 28 | 12/04/99 | 3:45 pm | 239.00 | 4900.00 | 95.12 | 8.00 | 96.65 | Young |
| 28 | 12/05/99 | 2:00 pm | 1096.00 | 3587.00 | 69.45 | 2.19 | 99.80 | J.Smith |
| 28 | 12/06/99 | 4:00 pm | 2190.00 | 10000.00 | 78.10 | 2.00 | 99.91 | Young |
| 28 | 12/07/99 | 12:00 pm | 789.00 | 10000.00 | 92.11 | 1.64 | 99.79 | J.Smith |
| 28 | 12/08/99 | 2:00 pm | 10000.00 | 10000.00 | 0.00 | 61.00 | 99.39 | Marcum |
| 28 | 12/09/99 | Plant shut down | | | #DIV/0! | | #DIV/0! | K.M. |

Fig. 4a

Table 3(b)
MICR-BLAZE FILTER READINGS
lift station #28 (EAST)

| LIFT STA # | DATE | TIME | OUTLET PPM | INLET PPM | % Decrease | U.S. Filter out | % Decrease | OPR. Initials |
|---|---|---|---|---|---|---|---|---|
| 28 | 12/10/99 | | 10000.00 | 10000.00 | 0.00 | 3.00 | 99.97 | K.M. |
| 28 | 12/11/99 | | 10000.00 | 10000.00 | 0.00 | 70.00 | 99.30 | K.M. |
| 28 | 12/12/99 | | 6.00 | 10000.00 | 99.94 | 1.00 | 83.33 | M.S. |
| 28 | 12/13/99 | | 766.00 | 4500.00 | 82.98 | 1.00 | 99.87 | Hill |
| 28 | 12/14/99 | | 265.00 | 10000.00 | 97.35 | 18.20 | 93.13 | M.S. |
| 28 | 12/15/99 | | 4.50 | 1700.00 | 99.74 | 4.00 | 11.11 | Hill |
| 28 | 12/16/99 | | 3.89 | 10000.00 | 99.96 | 1.80 | 53.73 | Carr |
| 28 | 12/17/99 | | 38.70 | 10000.00 | 1.00 | 1.70 | 95.61 | Carr |
| 28 | 12/18/99 | | 4.70 | 10000.00 | 99.95 | 1.00 | 78.72 | H.P. |
| 28 | 12/19/99 | | 36.00 | 10000.00 | 99.62 | 1.60 | 85.79 | Carr |
| 28 | 12/20/99 | RAIN OUT | | | #VALUE! | | #DIV/0! | |
| 28 | 12/21/99 | | 45.00 | 10000.00 | 99.55 | 2.00 | 95.56 | J.Young |
| 28 | 12/22/99 | | 49.00 | 10000.00 | 99.51 | 3.20 | 93.47 | E.C.H. |
| 28 | 12/23/99 | | 10000.00 | 10000.00 | 0.00 | 10000.00 | 0.00 | J.Young |

Fig. 4b

Table 3(c)
MICR-BLAZE FILTER READINGS
lift station #28 (EAST)

| LIFT STA # | DATE | TIME | OUTLET PPM | INLET PPM | % Decrease | U.S. Filter out | % Decrease | OPR. Initials |
|---|---|---|---|---|---|---|---|---|
| 28 | 12/24/99 | | 40.00 | 3573.00 | 98.88 | 8.00 | 80.00 | C.R. |
| 28 | 12/25/99 | | 36.00 | 2975.00 | 98.79 | 10.00 | 72.22 | C.R. |

Fig. 4c

Table 4
MICRO-BLAZE FILTER READINGS
lift stations #28 (Y2K)

| LIFT STA # | DATE | TIME | OUTLET PPM | INLET PPM | % Decrease | U.S. Filter out | % Decrease | OPR. Initials |
|---|---|---|---|---|---|---|---|---|
| | | | | | #DIV/0! | | #DIV/0! | |
| | | | | | #DIV/0! | | #DIV/0! | |
| | | | | | #DIV/0! | | #DIV/0! | |
| 28 | 01/01/00 | | 4850.00 | 10000.00 | 51.50 | 1.00 | 99.98 | Garland |
| 28 | 01/02/00 | | 7600.00 | 7600.00 | 0.00 | 3.90 | 99.95 | Garland |
| 28 | 01/03/00 | | 10000.00 | 10000.00 | 0.00 | 6.80 | 99.93 | Garland |
| 28 | 01/04/00 | | 10000.00 | 10000.00 | 0.00 | 6.80 | 99.93 | Carr |
| 28 | M/B FILTER DISCON. 1/4/00 | New Sol. in filter | | | #DIV/0! | 8799-10.55, 14.8-1.08 | #VALUE! | Carr |
| | | | | | #DIV/0! | | #DIV/0! | |
| | | | | | #DIV/0! | | #DIV/0! | |

PROCESS FOR REDUCING VOLATILE ORGANIC COMPOUND CONTENT OF REFINERY LIQUID WASTE STREAMS USING AQUEOUS SOLUTIONS CONTAINING MICROBES

CROSS-REFERENCE TO RELATED APPLICATION

This application claims the benefit of U.S. Provisional Application Serial No. 60/208,216 filed May 31, 2000.

BACKGROUND OF THE INVENTION

1. Field of the Invention

The present invention relates generally to biodegrading volatile organic compounds found in refinery liquid waste streams and, in particular, to a process and apparatus for removing volatile organic compounds from refinery liquid waste streams.

Processes for biodegrading hazardous organic waste are generally classified in U.S. Patent Office Class 435/262.5.

2. Description of the Related Art

Microbial degradation of oil dates back to at least 1942, when the American Petroleum Institute began to subsidize research in the field. Considerable basic knowledge about factors that affect natural biodegradation, about the kinds of hydrocarbons capable of being degraded, and about the species and distribution of the microorganisms involved in biodegradation had already been developed in the early 1970s. The Office of Naval Research sponsored more than a dozen basic and applied research projects in the late 1960s and early 1970s on oil biodegradation to control marine oil spills. Since this time, a large number of refineries, tank farms, and transfer stations now employ in situ bioremediation to restore land contaminated by accidental spills of fuel oil or other hydrocarbons.

The microorganisms so employed are capable of assimilating and breaking down non-soluble organic materials including hydrocarbons that convert grease and oil into relatively harmless substances of water-soluble products, carbon dioxide and a lesser quantity of fatty acids.

Oil refineries create liquid waste streams which can be difficult to clean up. Oily water sewers can contain dissolved volatilizable components which under ambient conditions emit volatile organic compounds (VOCs), e.g., benzene, as a vapor effluent. At least a portion of these VOCs must be removed or otherwise treated to conform to environmental regulations. Typically, such vapor effluents are treated by passing them through activated granulated charcoal filters which adsorb volatile hydrocarbons. However, removing the bulk of volatile hydrocarbons by this technique can be costly inasmuch as filters require frequent replacement.

Accordingly, it would be desirable to treat these vapor streams by removing most of the volatile organic compounds with an alternate technique which can be carried out at less expense and using activated granulated charcoal filters to remove any residual volatile organic compounds.

U.S. Patent Document H1,337 to Hoeppel discloses a biodegradation apparatus for treating contaminated soil which comprises an enclosed vessel through which is passed moistened air to remove volatile hydrocarbons from the soil. The outgoing air is supplied to a vapor phase bioreactor, e.g., a biofilter of granular activated carbon, for removal of hydrocarbon contaminants and thence to a conventional granular activated carbon filter to absorb remaining hydrocarbon contaminants.

U.S. Pat. No. 5,942,552 to Cox discloses microbiological fire-fighting formulation which comprises a bioremediating component such as *Bacillus subtilis*, surfactants, foaming agents, and inorganic nutrients.

U.S. Pat. Nos. 4,482,632 and 4,288,545 disclose microbiological strains which can be used to decompose organic compounds.

U.S. Pat. No. 5,232,596 to Castaldi discloses a slurry-phase bioremediation treatment of organic sludge by dissolving the contaminants into an aqueous phase and microbially degrading them. The process recirculates off-gas components such as benzene, toluene, xylenes, and naphthalene from the system back to one or more of the bioreactors, to return high volatility toxic constituents for increased microbial degradation and control of volatile toxic constituent emissions from the process.

SUMMARY OF THE INVENTION

In one aspect, the present invention relates to a process for reducing volatile organic compound content of a liquid refinery waste stream which can be integrated into an oil refinery process scheme. The process comprises exposing a liquid refinery waste stream comprising dissolved volatile organic compounds to conditions which volatilize the organic compounds to provide a waste vapor stream, contacting the waste vapor stream, preferably in a single pass, with an aqueous liquid medium containing volatile organic compound-metabolizing microbes under volatile organic compound-metabolizing conditions. Such contacting provides a treated waste vapor stream containing volatile organic compound metabolization products and reduced volatile organic compound content which can be further processed by passing said treated waste vapor stream through a volatile organic compound absorbing filter.

In another aspect, the present invention relates to an apparatus for reducing hydrocarbon content of a liquid refinery waste stream comprising dissolved volatile organic compounds which are volatilizable to provide a waste vapor stream. The apparatus comprises:

a) a receptacle having an inlet for introducing to the receptacle the refinery waste vapor stream which contains volatile organic compounds, an aqueous liquid medium containing hydrocarbon-metabolizing microbes, a means for contacting said aqueous liquid medium with said refinery waste vapor stream under hydrocarbon-converting conditions to provide a treated stream containing hydrocarbon decomposition products and reduced hydrocarbon content, and an outlet for removing said treated stream therefrom to the atmosphere or a filtering means. Thus the apparatus can further comprise b) a filtering means which contains an inlet connected to the outlet of said receptacle, a filtering element, and an outlet for passing a filtered product of further reduced hydrocarbon content (as compared to the treated stream from a)).

In yet another aspect, the present invention relates to a method of extending the life of an adsorbent which is used to adsorb volatile organic compounds in a vapor stream derived from a liquid refinery waste stream. The process comprises i) exposing said liquid refinery waste stream to conditions sufficient to volatilize VOCs dissolved therein to provide a vapor stream;

ii) contacting the vapor stream in a single pass with an aqueous liquid medium containing volatile organic compound-metabolizing microbes under volatile organic compound-metabolizing conditions to provide a treated stream containing volatile organic compound metabolization products and reduced volatile organic compound content; and iii) contacting the treated stream with the adsorbent.

BRIEF DESCRIPTION OF THE DRAWINGS

The FIG. 1 depicts simplified flow diagram of the invention process and apparatus for reducing hydrocarbon content of a refinery waste vapor stream.

FIGS. 2A, B, C, and D are tables showing filter readings over a period of 40 days at specified station.

FIGS. 3A and 3B are filter readings at a different station which was run intermittently for a period of 2 days and then 16 days.

FIGS. 4A, 4B and 4C are a table showing filter readings taken at a third station for a period of 26 days.

FIG. 5 is a table showing readings taken over a 3-day period.

DETAILED DESCRIPTION OF THE PREFERRED EMBODIMENTS

Liquid Waste Streams

Figure 1:
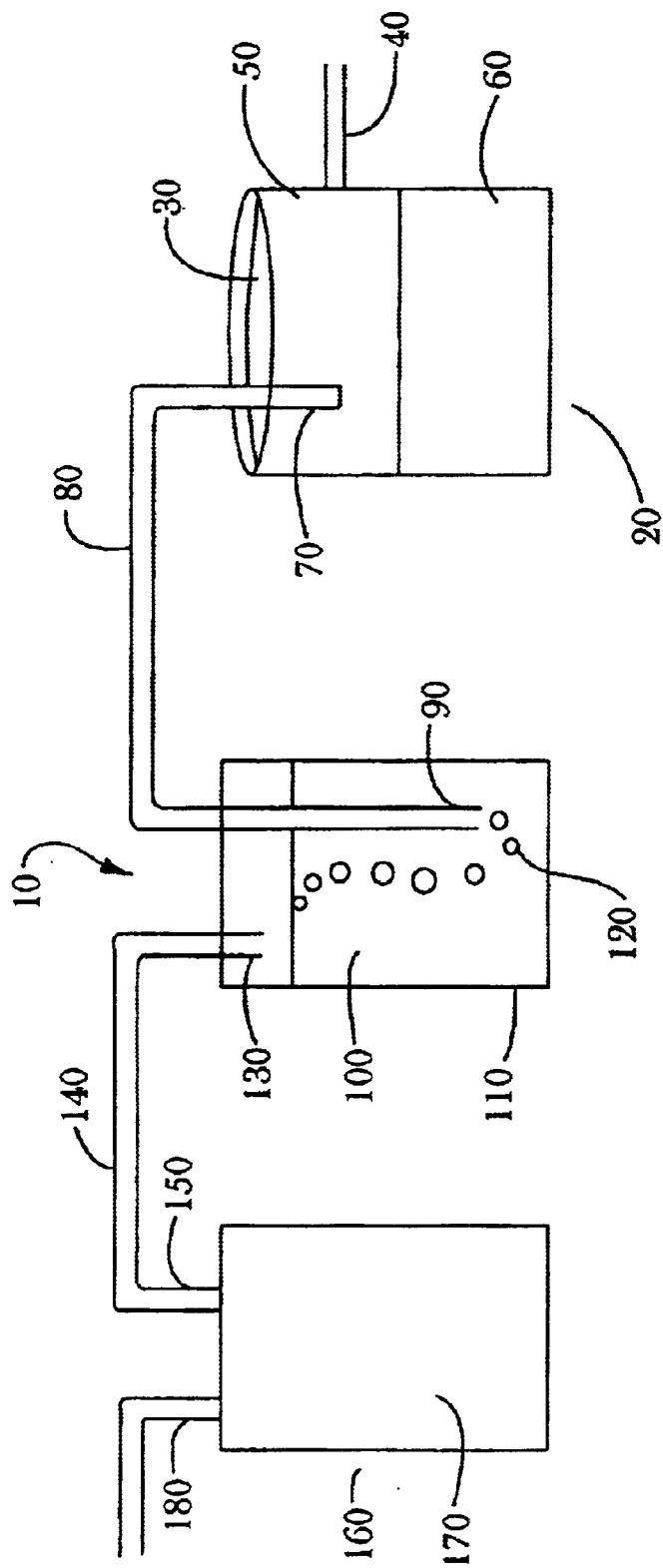

Suitable waste streams for treatment by the present invention include those which are typically generated in an oil refinery process scheme. These waste streams contain volatile organic compounds which can be selected from the group consisting of aliphatic hydrocarbons, aromatic hydrocarbons and halogenated hydrocarbons. The waste streams can include one or more of the following groups of compounds: (1) Purgeable aromatics (e.g. benzene, toluene, xylenes, ethylbenzene, and styrene); (2) purgeable halocarbons (e.g., chlorobenzene, 1,2-dichlorobenzene, 1,2-dichloroethane, and trichloroethylene); (3) polynuclear aromatic hydrocarbons (e.g., naphthalene, pyrene, anthracene, and chrysene); and (4) polychlorinated biphenyls with chlorinated isomers below pentachlorobiphenyl.

The microbial-based liquid refinery waste stream treatment process of the present invention can be applied to the treatment of numerous hazardous wastes and associated liquids including: refinery and petrochemical production oily sludges and asphaltic-type wastes; process waste slurries from organic chemicals production (e.g., styrene tars, solvent contaminated sludges from process tank bottoms); wood-tar based creosote (i.e., phenols and phenol derivatives) contaminated sludges and possibly coal-tar based creosote (i.e., naphthalene and anthracene) contaminated sludges; and some PCB contaminated sludges from CERCLA sites. The process of the present invention is particularly useful in treating vapor effluent from oily water sewers.

Gas-Liquid Contacting

Gas-liquid contacting of the volatile organic compound-containing vapor and the aqueous medium can be carried out by any suitable means of gas-liquid mixing, including, but not limited to, coarse-bubble diffusion, plenum-chamber diffusion, advanced gas reactor (AGR) systems, draft tube aerators with a large ring below the impeller, and propulsion of the liquid into the gas above the liquid surface. See, for example, U.S. Pat. No. 5,874,003 to Rose issued Feb. 23, 1999, U.S. Pat. No. 5,035,795 to Schmid issued Jul. 30, 1991 entitled "Modular Clarifier with Integral Flocculator"; U.S. Pat. No. 5,009,816 to Wiese et al issued Apr. 23, 1991 entitled "Broad Liquid Level Gas-Liquid Mixing Operations"; U.S. Pat. No. Re 32,562 to Litz issued Dec. 15, 1987 entitled "Process and Apparatus for Mixing a Gas and a Liquid"; U.S. Pat. No. 4,681,711 to Eaton issued Jul. 21, 1987 entitled "Method and Apparatus for Aeration of Wastewater Lagoons"; U.S. Pat. No. 3,521,864 to Welles issued Jul. 28, 1970 entitled "Method and Apparatus for Controlling Oxygen Transfer and Power Requirements in a Water Aeration System"; and Scroggins & Deiters, Wastewater Cleanup: Put Activated-Sludge Treatment to Work, Environmental Engineering World, November–December 1995, at 22; each of which are incorporated herein by reference. The design of the size, orientation, and capacity of the gas-liquid contacting means can be determined by one of skill in the art depending on the design process conditions for the liquid waste treatment system.

The gas-liquid contacting can be effected by bubbling the refinery waste vapor stream through the aqueous liquid medium by means of a simple bubbling device, such as a hose, placed in a tank containing the aqueous medium with microbes. Volatile organic compound-containing vapor is taken off from a sealed vessel, e.g., an oily water sewer, through a suitable conduit such as a hose or pipe having an end positioned above the liquid. The other end of the conduit is routed to the lower portion of another vessel which is partially filled with aqueous medium containing microbes. This end of the conduit is submerged in the aqueous medium, preferably at the lowest practicable level so as to maximize the vertical length which released vapor, e.g., in the form of bubbles, travels through the aqueous medium, thus enhancing mixing efficiency. In its simplest form, the submerged end of the conduit may terminate without any variation of its end. Alternatively, a nozzle of conventional design which improves dispersion of vapor can be placed on the conduit end to improve mixing.

Microbe-Containing Aqueous Liquid Media

The biological material-containing solution employed in the present invention necessarily comprises hydrocarbon degrading biological materials or microbes such as bacteria, fungi, bacterial enzymes, or fungal enzymes in water.

Usable bacteria include: Achromobacter, Arthrobacter, Aspergillus, Bacillus, Candida, Cladosporium, Cornynebacterium, Myrothecium, Nocardia, Penicillium, Phialophora, Pseudomonas, Rhodotorula, Streptomyces, Trichoderma, and a blend of anaerobic and facultative organisms. Of these, Bacillus is preferred, especially endospore-forming bacteria such as those selected from the group consisting of *Bacillus subtilis, Bacillus licheniformis,* and *Bacillus polymyxa*. These are available, e.g., from Sybron Chemicals, Inc. and are further described in U.S. Pat. Nos. 4,482,632 and 4,288,545, incorporated herein by reference.

In addition to the microbial component, inorganic nutrients are provided in the solution to support the reproduction and growth of the microbe strains. The inorganic nutrients can be water soluble sources of soluble nitrogen, phosphorus and potassium, e.g., 0.1 wt. % to 0.3 wt. % 15-30-15 commercial fertilizer in water. Conventional stabilizer, preservative, and perfume or deodorant components may also be present in the aqueous medium.

A preferred aqueous medium comprising the microbe is MICRO-BLAZE®, available from Verde Environmental, Inc. of Houston, Texs. which contains in addition to bacterial cultures, a non-ionic detergent, fragrance, chelating agent and opacifier. The MICRO-BLAZE® can be diluted for use in the present invention by water to a mixture containing 3% MICRO-BLAZE®. A MICRO-BLAZE® formulation is further described in U.S. Pat. No. 5,942,552 to Cox incorporated herein by reference.

VOC-Metabolizing Conditions

Conditions maintained within the microbe-containing aqueous medium depend on the particular microbes employed. Generally temperatures ranging from 45°–110° F., preferably 70°–99° F. can be used. pH can range from 5.5 to 9.5, preferably 6.0 to 9.0. Contact with the microbes ranges from about 0.01 to 100 hours, preferably 0.1 to 10 hours, say about 2 hours. In general, employing the upper reaches of these temperature ranges permit the microbes to operate with greater efficiency.

Adsorbents

The present invention can be practiced both with natural adsorbents and with synthetic adsorbents. Carbon is the typical natural adsorbent used in most applications. The form of carbon used as an adsorbent is referred to as activated carbon and is preferably in granulated form. Such carbon is available in a variety of forms, but generally has a large surface area per unit weight, typically at least 500, preferably at least 800, more preferably at least 1000, square meters per gram. The materials have a pore volume of at least 0.5, preferably 0.7, and more preferably 0.9 ml/g.

However, the decision to use a particular adsorbent for a given adsorbate is not based solely on relative surface area and void volumes. The pores within any adsorbent, including activated carbon adsorbents, vary widely in size (radius) of the pores. It is actually the pore size distribution and not the total surface area or pore volume that determines how well an adsorbent will adsorb in a given situation (i.e., a particular solvent and/or adsorbate). Pore size distribution is determined by the number of pores within a given pore size radius. An adsorbent having a narrow pore size distribution and numerous micropores is particularly suitable for gas-phase adsorption, since the molecules being adsorbed are small and the numerous micropores provide a high surface area per weight of adsorbent. However, the same adsorbent can be inefficient in other processes, such as when adsorbing large molecules. The larger molecules may not be able to enter the smaller pores. In this case, an adsorbent having a pore size distribution with larger pore sizes would be a better choice for an adsorbent, even though the adsorbent would have a lower surface area per weight. Although the techniques of the invention will improve the performance of any combination of adsorbent, adsorbate, and solvent, the optimum combination is best determined by empirical selection.

The invention can be practiced with any adsorbent, such as zeolite, silica gel, or synthetic organic polymers, and is not limited to any particular adsorbent, such as carbon, granular coke, glass beads, or peat.

Carbon is used in the preceding paragraphs of this section merely as an example, and there is no intention here to limit the adsorbents with which the invention is practiced, since the theory of physical adsorption applies equally to any physical adsorbent. Over the last decade the Rohm and Haas Company and others, e.g. Dow Chemical, have developed a series of commercial, synthetic polymer adsorbents as alternatives to carbon based adsorbents. These products are in the form of hard spherical beads that are non-dusting and attrition-resistant. The polymers have a macroreticular structure characterized by having large surface areas relative to conventional gel structures. The polymers are formed by precipitation in a solvent, and the precipitation process results in trapping of solvent between precipitating portions of the polymer, thereby providing the microporous structure of the finished resin. The macroreticular polymerization technique is applicable to a wide variety of monomers, which can essentially be hydrocarbons or can contain functional groups. For example, Ambersorb™563 is a sulfonated polymer of divinylbenzene that has been carbonized. Dow XUS-43493 is a copolymer of styrene and divinylbenzene. Polymers of the Amberlite™ XAD-2 and XAD-4 series are generally copolymers of styrene and divinylbenzene. Amberlite XAD-7 and XAD-8 are acrylic esters. Amberlite XAD-16 is a polymer of divinylbenzene. Amberlite XAD-16 polymeric resin is a particularly useful adsorbent due to its relatively high adsorption capacity and fast adsorption kinetics. However, other adsorbents with similar pore size and chemical composition are available and may be used instead of XAD-16.

Some adsorbents are originally synthetic but are essentially made of a carbonaceous material in their final form. A typical example is Ambersorb™. The Ambersorb materials are prepared from a sulfonated styrene/divinylbenzene macroreticular ion exchange resin with a moderate surface area. This resin is then pyrolyzed to form the carbonaceous final product. Ambersorb is available in a variety of different void volumes and other adsorbing properties. Surface areas (BET surface area) range from about 500 to over 1000 square meters per gram. The adsorption media that are used in the present invention have different binding capacities and binding energies. For example, Amberlite™ XAD-16, Ambersorb™563, and carbon each have progressively higher binding energies. The loading capacities, i.e., the maximum weight of organic material per weight of adsorption medium, of these three adsorption media follow the same trend.

Some adsorbents, such as carbon, have high capacity during adsorption and also easily desorb low-boiling compounds. High boiling compounds are difficult to desorb from many adsorbents. It appears that there are a large number of low energy states (strong binding sites) in carbon, and the high-boiling compounds can only be driven out of these sites at high temperatures. However, many organic compounds with high boiling points tend to polymerize when heated. Thus, it is difficult to desorb high boiling point compounds from the low energy sites (strong binding sites) of adsorbents.

In the present invention, this problem can be overcome by including an unloading compound in the adsorbent before the adsorption process is begun. This unloading compound is preloaded on the adsorbent in a sufficient amount to fill the low energy sites in the adsorbent, thereby preventing high boiling components of a complex mixture from entering these sites. The high boiling point compounds in the pollutant are then more readily removed from the adsorbent during the heating/regeneration process, as they are present on the less tightly bound sites only.

In certain preferred embodiments, a self-contained adsorbent canister for use in the system of the invention is provided. The canister is in the form of a pressure-resistant chamber having an inlet and an exit for gas, each of which is adapted to be connected to the remainder of the system. Sealable ports are preferred in order to prevent evaporation of the unloading compound or contamination of the adsorbent (for example, by adsorption of atmospheric water vapor) during storage. For example, each of the ports can comprise an on/off (open/shut) valve and a threaded fitting for connecting to piping in the adsorption system. An adsorbent will be located in the interior of the canister container, and an unloading compound can be preloaded on the adsorbent, as described herein. Particularly preferred filters for treating the effluent from the aqueous medium-containing vessels are U.S. Filter carbon canister filters available from U.S. Filter of Vineland, N.J. or Palm Desert, Calif.

The carbon filters, per se, form no part of the invention. They are well-known and widely used; a typical refining or petrochemical plant may have 50–100 or more associated with tanks or sewer systems that vent into the air. The filters are frequently used in steel or plastic containers that look like 55 gallon drums.

Other suitable filter systems include those available from Wheelabrator Clean Air Systems, Inc., Westates Carbon Products, Los Angeles, Calif. These include "Vent-Scrub" adsorbers, e.g., VSC-200-Z having an inlet and outlet of 2" diameter, a carbon fill volume of 5.2 cubic feet, and a cross sectional area of 2.8 square feet. Operating specifications include, a flow of 100 cfm (max.), a pressure of 12 psig (max.), a vacuum of 9 psig (max.), and a temperature of 120° (max.). Such an adsorber can contain 150 pounds of activated carbon, such as Westates Carbon Model No. CC-60 1, a coconut shell carbon of U.S. sieve 4×8 size.

In one embodiment the apparatus employed in the present invention can contain a plurality of adsorbers connected in series, preferably two.

Referring to FIG. 1 there is shown a biodegradation apparatus designated generally-by the reference numeral 10 which may be used to remove volatile organic compounds, e.g., benzene and toluene from a liquid refinery waste stream which can be integrated into an oil refinery process scheme. Biodegradation apparatus 10 comprises an in-ground or above ground holding vessel or tank 20 which may be fabricated from concrete or other nonporous materials sufficient in strength to hold a large volume of a liquid refinery waste stream comprising water and volatile organic compounds, e.g., those residing in an oily water sewer. Vessel 20 is preferably a closed vessel having any capacity, say, one to one million gallons, preferably 100 to 100,000 gallons. The vessel may have a removable top 30 to facilitate cleaning and maintenance. Oily waste water containing volatile organic compounds enters vessel 20 via line 40. The volatile organic compound content of the liquid waste stream can range from the solubility limit, or less, up to 100 wt. % hydrocarbon, preferably from 0.5 to 99.0 wt. %. water. Conditions are maintained in vessel 20 which volatilize the volatile organic compounds providing a gaseous phase 50 above the surface of the liquid 60 containing 1 to 100000 ppm volatile organic compound content, preferably 10 to 15000 ppm, e.g., about 8000 to 12000 ppm. Such volatilizing conditions include temperatures ranging from 0° to 80° C., preferably 10° to 50° C., e.g., ambient temperatures, pressures ranging from 0.1 to 10 atmospheres, preferably atmospheric pressure, and exposure times ranging from 0.1 to 100 hours, preferably 0.5 to 10 hours. Typical oily water sewer conditions provide sufficient volatilizing effects to provide operation of the present invention. Preferably, $N_2$ pressure is maintained on vessel 20 to prevent air from being introduced into the system and to help push the vapors through the filtering system.

The volatile organic compounds which are driven off the liquid waste stream pass through one end 70 of conduit 80 whose other end 90 is positioned within a microbe-containing aqueous medium 100 located in microbe-containing aqueous medium vessel 110, preferably as low as practicable to maximize the length of the path which the vapor, e.g., in the form of a bubble 120, takes through the aqueous medium. The aqueous medium contains well known, commercially available nutrients to promote biological growth whereby the remaining hydrocarbon contaminants can be converted into environmentally-safe and non-toxic by-products. The nutrients can include ammonium nitrate or soluble phosphates, as well as pH buffers such as sodium hydroxide or hydrochloric acid to maintain a near neutral pH. The vapor in the bubble contacts the microbes in the aqueous medium causing conversion of at least part of the volatile organic compounds to bioremediatable by-products such as carbon dioxide and water. Conditions maintained in the aqueous medium vessel 110 are sufficient to optimize the hydrocarbon-converting activity of the microbes present and can include temperatures ranging from 0 to 80° C., preferably 10 to 40° C., say, 37° C., pH controlled as necessary to a range suitable for the microbes, e.g., ranging from 5 to 8, preferably 6 to 7.5 and pressures ranging from 0.1 to 10 atmospheres, preferably 0.5 to 2 atmospheres, e.g., atmospheric pressure. The liquid level of the microbe solution has a direct effect on the amount of pressure required to push the vapors from vessel 20 through the solution. In the present case no greater than 30 inch # of water is desired, so the level of microbe-containing solution was maintained at about 18" of solution or 30 gallons in a 55 gallon drum (inch # of water being different than psi). The aqueous medium vessel 110 may have a capacity of 0.1 to 10000 gallons, preferably 1 to 1000 gallons, e.g., 50 to 60 gallons. In an especially preferred embodiment, the aqueous medium vessel is a 55 gallon drum which contains about 30 gallons of aqueous microbial solution.

The by-products, e.g., water and carbon dioxide, and unreacted volatile organic compound-containing vapor are released at the surface of the aqueous medium passing thence out of vessel 110 to the atmosphere or alternatively, through one end 130 of a conduit 140 which terminates at inlet 150 of a filter canister 160. The vapor is then directed through an adsorbent material 170 such as activated carbon which adsorbs at least some of the residual volatile organic compounds present in the effluent after microbe treatment. The resulting filtered stream passes out of filter canister 160 through filter canister outlet 180 and can be released to the atmosphere. The process of the present invention can provide a substantial reduction in volatile organic compound content of vapors released from the liquid waste stream. Liquid waste streams which emit vapors having 10000 or more ppm volatile organic compound content can be treated by the microbes of the aqueous medium to levels of 3 ppm or lower. Additional treatment by adsorbent filter can further reduce the vapor to any desired level. Such measurement of hydrocarbon vapor can be achieved by any suitable means, e.g., a photoionization detector.

The process of the present invention is particularly advantageous inasmuch as it can be carried out as a single pass operation under very little vapor pressure, thus obviating pumping means or recycle gas compressors. Vapor can be transported through the process by passive means, e.g., by adding liquid in to vessel 20 which raises the liquid volume while reducing the vapor volume and hence vapor pressure. Heat generated during the process, e.g., by microbial conversion of volatile organic compounds can further contribute to increased vapor pressures assisting in vapor transport. The resulting process thus is economical, simple and reliable.

Example

A sealed oily water sewer system has a holding tank containing a liquid phase of oily water. Volatile organic compound is emitted from the oily water sewer which is maintained at ambient temperatures and ambient pressure, to provide a vapor phase which contains about 10000 ppm volatile organic compounds. The vapor phase passes out of the oily water sewer holding tank through a conduit opening into the lower portion of a 55 gallon drum which contains 30 gallons of a commercially available MICRO-BLAZE® solution diluted to 3 wt. % in water. The vapor effluent from the microbial solution was largely carbon dioxide and contained only 3 ppm volatile organic compound. This effluent was then passed to two carbon canisters in series whose final effluent measured only 1–3 ppm volatile organic compound content.

The process was continued for approximately twenty to twenty-five days and resulted in the conversion of volatile organic compound to carbon dioxide and water. The carbon canisters in this arrangement required replacement only every 20 to 30 days compared to 4 to 7 days in the absence of microbial treatment.

Further details of the runs are provided in Tables 1–4 as shown in FIGS. 2A, 2B, 2C, 3A, 3B, and 4A, 4B, 4C and 4D and FIG. 5.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

What is claimed is:

1. A process for reducing volatile organic compound content of a liquid refinery waste stream which comprises providing a vapor stream containing volatile organic compounds derived from said liquid refinery waste stream, and contacting said vapor stream with an aqueous liquid medium containing volatile organic compound-metabolizing microbes under volatile organic compound-metabolizing conditions to provide a treated stream containing volatile organic compound metabolization products and reduced volatile organic compound content, wherein raid contacting is carried out in a closed receptacle having an inlet for said refinery waste vapor stream and an outlet for said treated stream, and wherein $N_2$ pressure is maintained on the liquid refinery waste stream to prevent air from being introduced into the process and to help push the vapor stream through the aqueous liquid medium containing volatile organic compound-containing-metabolizing microbes.

2. The process of claim 1 wherein said contacting is carried out in a single pass.

3. The process of claim 1 wherein said volatile organic compounds are selected from the group consisting of aliphatic hydrocarbons, aromatic hydrocarbons and halogenated hydrocarbons, and said volatile organic compound metabolization products include carbon dioxide and water.

4. The process of claim 1 wherein said contacting comprises bubbling said refinery waste vapor stream through said aqueous liquid medium.

5. The process of claim 1 which further comprises passing said treated stream through a volatile organic compound absorbing filter means to provide a filtered effluent of further reduced volatile organic compound content.

6. The process of claim 5 wherein said volatile organic compound absorbing filter comprises an element selected from the group consisting of activated granular carbon, granular coke, glass beads, and peat.

7. The process of claim 5 which further comprises venting said filtered effluent to the atmosphere.

8. The process of claim 1 wherein said microbe is an endospore-forming bacteria selected from the group consisting of *Bacillus subtilis, Bacillus licheniformis*, and *Bacillus polymyxa*.

9. The process of claim 1 wherein said microbe is *Bacillus subtilis*.

10. The process of claim 1 wherein said aqueous liquid medium comprises inorganic nutrients.

11. The process of claim 1 wherein said refinery waste vapor stream is taken from an oily water sewer.

12. A method of extending the life of an absorbent which is used to absorb volatile organic compounds in a refinery waste vapor stream which comprises i) contacting said vapor stream in a single pass with an aqueous liquid medium containing volatile organic compound-metabolizing microbes under volatile organic compound-metabolizing conditions to provide a treated stream containing volatile organic compound metabolization products and reduced volatile organic compound content wherein said contacting is carried out in a closed receptacle having an inlet for said refinery waste vapor stream and an outlet for said treated stream, and wherein $N_2$ pressure is maintained on the liquid refinery waste stream to prevent air from being introduced into the process and to help push the vapor stream through the aqueous liquid medium containing volatile organic compound-containing-metabolizing microbes, and ii) contacting said treated stream with said absorbent.

* * * * *